(12) United States Patent
Kasuya

(10) Patent No.: US 12,019,923 B2
(45) Date of Patent: Jun. 25, 2024

(54) IMAGE FORMING APPARATUS, METHOD OF CONTROLLING IMAGE FORMING APPARATUS, AND STORAGE MEDIUM FOR DISPLAYING GUIDE SCREENS FOR SETTING SHEETS

(71) Applicant: CANON KABUSHIKI KAISHA, Tokyo (JP)

(72) Inventor: Kenji Kasuya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/052,138

(22) Filed: Nov. 2, 2022

(65) Prior Publication Data

US 2023/0289108 A1  Sep. 14, 2023

(30) Foreign Application Priority Data

Nov. 8, 2021  (JP) ................................. 2021-181756

(51) Int. Cl.
*G06F 3/12* (2006.01)
(52) U.S. Cl.
CPC .......... *G06F 3/1205* (2013.01); *G06F 3/1232* (2013.01); *G06F 3/1255* (2013.01); *G06F 3/1286* (2013.01); *G06F 3/1287* (2013.01); *G06F 3/1288* (2013.01)

(58) Field of Classification Search
None
See application file for complete search history.

(56) References Cited

U.S. PATENT DOCUMENTS

| 11,144,260 | B2 | 10/2021 | Kakitsuba |
| 2020/0133591 | A1* | 4/2020 | Kaneda ................... G06F 3/122 |
| 2020/0225890 | A1 | 7/2020 | Kakitsuba |
| 2021/0089250 | A1* | 3/2021 | Jo ......................... G06F 3/1285 |

FOREIGN PATENT DOCUMENTS

| JP | 2017167670 A | 9/2017 |
| JP | 2020113060 A | 7/2020 |

* cited by examiner

*Primary Examiner* — Lennin R RodriguezGonzalez
(74) *Attorney, Agent, or Firm* — Canon U.S.A., Inc. IP Division

(57) ABSTRACT

According to an aspect of the present disclosure, an image forming apparatus comprises a receiving unit configured to receive an instruction from a user, an obtaining unit configured to obtain, from a server system, print data by accessing the server system in response to the instruction received by the receiving unit, and a control unit configured to display a method of setting a sheet on which the print data is printed on a display unit in a case where the obtained print data by the obtaining unit includes information of a predetermined sheet.

7 Claims, 18 Drawing Sheets

FIG. 4A

| DEVICE SERIAL NO.: | abcd0101 |
|---|---|

APPLICATION MANAGEMENT

PRINT INVOICE FOR TRANSPORT COMPANY A > AUTHENTICATION SETTING OF INVOICE ISSUING SERVICE

AUTHENTICATION SETTING OF INVOICE ISSUING SERVICE

| NUMBER | SERVICE NAME | REGISTRATION STATUS | SERVICE AUTHENTICATION STATUS | |
|---|---|---|---|---|
| 1 | FIRST INVOICE ISSUING SERVICE FOR TRANSPORT COMPANY A | NOT REGISTERED | NOT AUTHORIZED | EDIT — 401 |
| 2 | SECOND INVOICE ISSUING SERVICE FOR TRANSPORT COMPANY A | NOT REGISTERED | NOT AUTHORIZED | EDIT |

FIG. 4E

| DEVICE SERIAL NO. : abcd0101 |
| APPLICATION MANAGEMENT | PRINT INVOICE FOR TRANSPORT COMPANY A > AUTHENTICATION SETTING OF INVOICE ISSUING SERVICE |

AUTHENTICATION SETTING OF INVOICE ISSUING SERVICE

| NUMBER | SERVICE NAME | REGISTRATION STATUS | SERVICE AUTHENTICATION STATUS | |
|---|---|---|---|---|
| 1 | FIRST INVOICE ISSUING SERVICE FOR TRANSPORT COMPANY A | REGISTERED | AUTHORIZED | EDIT |
| 2 | SECOND INVOICE ISSUING SERVICE FOR TRANSPORT COMPANY A | NOT REGISTERED | | EDIT |

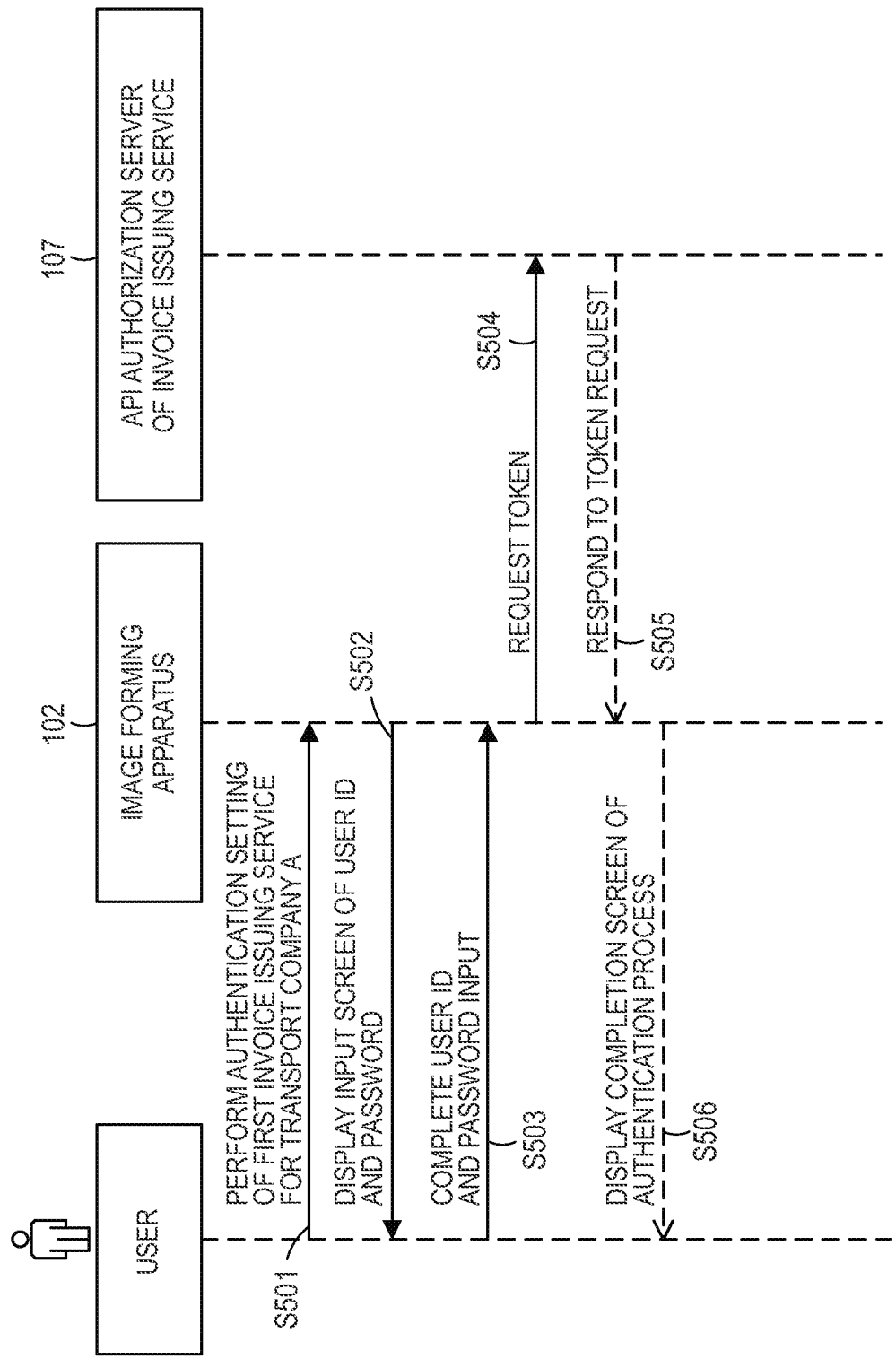

FIG. 8A

PRINT INVOICE FOR TRANSPORT COMPANY A

SELECT INVOICE ISSUING SERVICE

PLEASE SELECT INVOICE ISSUING SERVICE.

- FIRST INVOICE ISSUING SERVICE FOR TRANSPORT COMPANY A — 801
- SECOND INVOICE ISSUING SERVICE FOR TRANSPORT COMPANY A

[CANCEL] [TO INPUT RESERVATION NUMBER] — 802

FIG. 8B

PRINT INVOICE FOR TRANSPORT COMPANY A

INPUT RESERVATION NUMBER

PLEASE INPUT RESERVATION NUMBER AND PASSWORD OF INVOICE.

RESERVATION NUMBER [ ]

PASSWORD [ ]

[CANCEL] [OBTAIN PRINT DATA OF INVOICE] — 803

FIG. 8C

PRINT INVOICE FOR TRANSPORT COMPANY A

INPUT RESERVATION NUMBER

CURRENTLY IN COMMUNICATION

NOW RETRIEVING PRINT DATA OF INVOICES. PLEASE WAIT A MOMENT.

[ABORT]

FIG. 8D

PRINT INVOICE FOR TRANSPORT COMPANY A

INPUT RESERVATION NUMBER

SPECIFIED INVOICE CAN NOT BE PRINTED BY PRESENT APPARATUS

[CLOSE] — 804

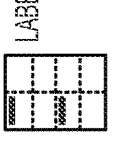

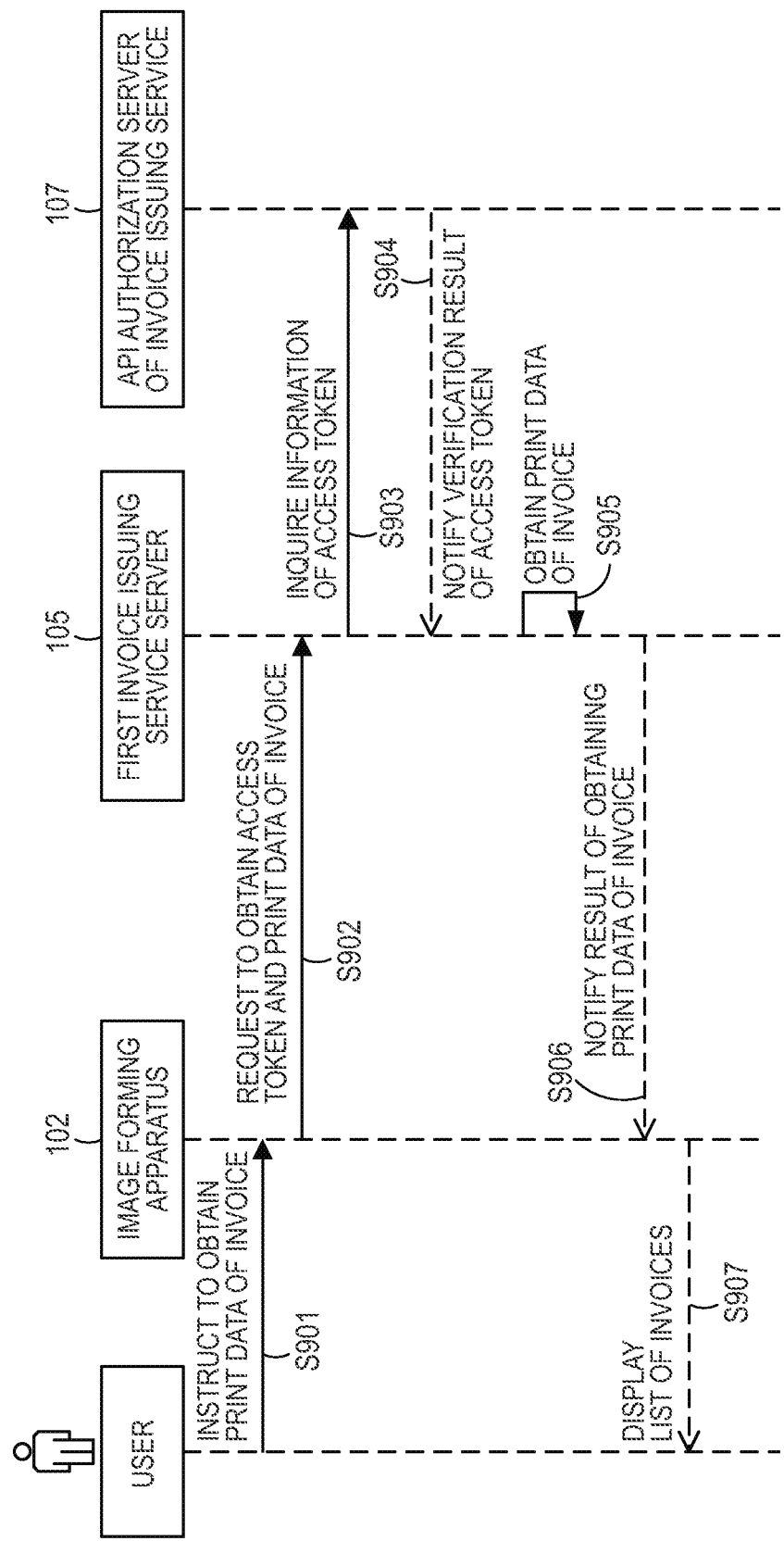

FIG. 10A

INVOICE PRINTING CONDITION TABLE FOR COLOR LASER PRINTERS

| INVOICE ISSUING SERVICE | TYPE OF INVOICE | SHEET SIZE | SHEET TYPE | TRAY TYPE | SHEET ORIENTATION | PRINTING SIDE | PRINTING COLOR MODE | PRINTING AVAILABILITY |
|---|---|---|---|---|---|---|---|---|
| FIRST INVOICE ISSUING SERVICE FOR TRANSPORT COMPANY A | TYPE 1 OF INVOICE | A4 | LABEL SHEET | MANUAL FEED TRAY | SET SHEET VERTICALLY | SET FACE UP | MONOCHROME | AVAILABLE |
| FIRST INVOICE ISSUING SERVICE FOR TRANSPORT COMPANY A | TYPE 2 OF INVOICE | A5 | LABEL SHEET | MANUAL FEED TRAY | SET SHEET HORIZONTALLY | SET FACE UP | MONOCHROME | AVAILABLE |
| SECOND INVOICE ISSUING SERVICE FOR TRANSPORT COMPANY A | — | A4 | PLAIN SHEET | MANUAL FEED TRAY | SET SHEET VERTICALLY | — | COLOR | AVAILABLE |

FIG. 10B

INVOICE PRINTING CONDITION TABLE FOR MONOCHROME LASER PRINTERS

| INVOICE ISSUING SERVICE | TYPE OF INVOICE | SHEET SIZE | SHEET TYPE | TRAY TYPE | SHEET ORIENTATION | PRINTING SIDE | PRINTING COLOR MODE | PRINTING AVAILABILITY |
|---|---|---|---|---|---|---|---|---|
| FIRST INVOICE ISSUING SERVICE FOR TRANSPORT COMPANY A | TYPE 1 OF INVOICE | A4 | LABEL SHEET | MANUAL FEED TRAY | SET SHEET VERTICALLY | SET FACE UP | MONOCHROME | AVAILABLE |
| FIRST INVOICE ISSUING SERVICE FOR TRANSPORT COMPANY A | TYPE 2 OF INVOICE | A5 | LABEL SHEET | MANUAL FEED TRAY | SET SHEET HORIZONTALLY | SET FACE UP | MONOCHROME | AVAILABLE |
| SECOND INVOICE ISSUING SERVICE FOR TRANSPORT COMPANY A | — | A4 | PLAIN SHEET | MANUAL FEED TRAY | SET SHEET VERTICALLY | — | COLOR | NOT AVAILABLE |

FIG. 10C

INVOICE PRINTING CONDITION TABLE FOR INKJET PRINTERS

| INVOICE ISSUING SERVICE | TYPE OF INVOICE | SHEET SIZE | SHEET TYPE | TRAY TYPE | SHEET ORIENTATION | PRINTING SIDE | PRINTING COLOR MODE | PRINTING AVAILABILITY |
|---|---|---|---|---|---|---|---|---|
| FIRST INVOICE ISSUING SERVICE FOR TRANSPORT COMPANY A | TYPE 1 OF INVOICE | A4 | LABEL SHEET | MANUAL FEED TRAY | SET SHEET VERTICALLY | SET FACE UP | COLOR | AVAILABLE |
| FIRST INVOICE ISSUING SERVICE FOR TRANSPORT COMPANY A | TYPE 2 OF INVOICE | A5 | LABEL SHEET | MANUAL FEED TRAY | SET SHEET HORIZONTALLY | SET FACE UP | COLOR | AVAILABLE |
| SECOND INVOICE ISSUING SERVICE FOR TRANSPORT COMPANY A | — | A4 | PLAIN SHEET | MANUAL FEED TRAY | SET SHEET VERTICALLY | — | COLOR | AVAILABLE |

IMAGE FORMING APPARATUS, METHOD OF CONTROLLING IMAGE FORMING APPARATUS, AND STORAGE MEDIUM FOR DISPLAYING GUIDE SCREENS FOR SETTING SHEETS

BACKGROUND

Field of the Disclosure

The present disclosure relates to an image forming apparatus for obtaining and printing print data, a method of controlling the image forming apparatus, and a storage medium.

Description of the Related Art

Conventionally, a service is provided to create, register, and print an invoice when shipping packages using cloud services of transportation companies (hereinafter referred to as the "invoice issuance service"). Japanese Patent Application Laid-Open No. 2017-167670 proposes a technology in which a transmitter of a package creates and registers an invoice in advance via the invoice issuing service of the carrier, inputs an acceptance number (reservation number) issued at the time of registration into a dedicated terminal installed at a counter, and prints the invoice out on a dedicated invoice printing sheet.

In recent years, there has also been a service that allows the transmitter to print the invoice on the transmitter's own printer without the use of a dedicated terminal installed at a carrier's delivery counter. In Japanese Patent Application Laid-Open No. 2020-113060, a special printer driver that makes a one-to-one correspondence between a type of a printer connected to an information processing apparatus such as a personal computer and a type of an invoice is registered in the information processing apparatus. When a user prints an invoice using this special printer driver, a screen showing the type of invoice printing sheet and how to place sheets on a sheet tray is displayed on a display of the information processing apparatus just before printing is performed. Thus, a technique is proposed to enable the user to easily recognize operations that need to be performed on a printer for printing an invoice.

According to the technology of Japanese Patent Application Laid-Open No. 2017-167670, printing is performed on an invoice printing sheet that is stored in advance in a dedicated printer connected to a dedicated terminal of a carrier's delivery counter, so that a transmitter does not have to perform troublesome operations such as placing a sheet on a sheet tray. However, it is a burden on the transmitter because transmitter has to go directly to the carrier's delivery counter.

In addition, according to the technology of Japanese Patent Application Laid-Open No. 2020-113060, it is complicated to operate the printer while checking the guide screen displayed on the display of the information processing apparatus. It is not easy to check, especially if the printer is located far from the information processing apparatus, and the user would often go back and forth between the information processing apparatus and the printer to check how to set the sheet. In addition, no disclosure has been made on how to print the invoice directly from the printer without using an information processing apparatus, or how to make the user easily aware of the operations that need to be performed on the printer. Invoice printing sheets are often relatively expensive and special, and if the wrong type of invoice printing sheet is used, or if the printing settings or the sheet placement direction on the tray is wrong, a misprint will occur and the expensive sheet will be wasted.

SUMMARY

Some embodiments of the present disclosure have been made to solve the above problems. The present disclosure provides a mechanism that enables a user to easily recognize operations that need to be performed on an image forming apparatus, even if an invoice is printed by the image forming apparatus alone without using an information processing apparatus such as a personal computer.

According to an aspect of the present disclosure, an image forming apparatus comprises a receiving unit configured to receive an instruction from a user, an obtaining unit configured to obtain, from a server system, print data by accessing the server system in response to the instruction received by the receiving unit, and a control unit configured to display a method of setting a sheet on which the print data is printed on a display unit in a case where the obtained print data by the obtaining unit includes information of a predetermined sheet.

Further features of various embodiments will become apparent from the following description of exemplary embodiments with reference to the attached drawings.

BRIEF DESCRIPTION OF THE DRAWINGS

FIG. 4A illustrates an invoice issuing service authentication setting screen of the present embodiment.

FIG. 4E illustrates the invoice issuing service authentication setting screen of the present embodiment.

FIG. 5 illustrates an authentication sequence on an invoice issuing service API authorization server.

FIG. 8A illustrates the operation screen of the invoice printing application.

FIG. 8B illustrates the operation screen of the invoice printing application.

FIG. 8C illustrates the operation screen of the invoice printing application.

FIG. 8D illustrates the operation screen of the invoice printing application.

FIG. 8E illustrates the operation screen of the invoice printing application.

FIG. 8F illustrates the operation screen of the invoice printing application.

FIG. 8G illustrates the operation screen of the invoice printing application.

FIG. 8H illustrates the operation screen of the invoice printing application.

FIG. 9 illustrates the sequence of obtaining invoice print data from the invoice issuing service server.

FIG. 10A illustrates the invoice printing conditions table.

FIG. 10B illustrates an invoice printing conditions table.

FIG. 10C illustrates the invoice printing conditions table.

DESCRIPTION OF THE EMBODIMENTS

Embodiments of the present disclosure will be described in detail below with reference to the drawings. It should be noted that the following embodiments do not limit the claims, and not all combinations of features described in the embodiment are essential to every embodiment.

Figure 1:
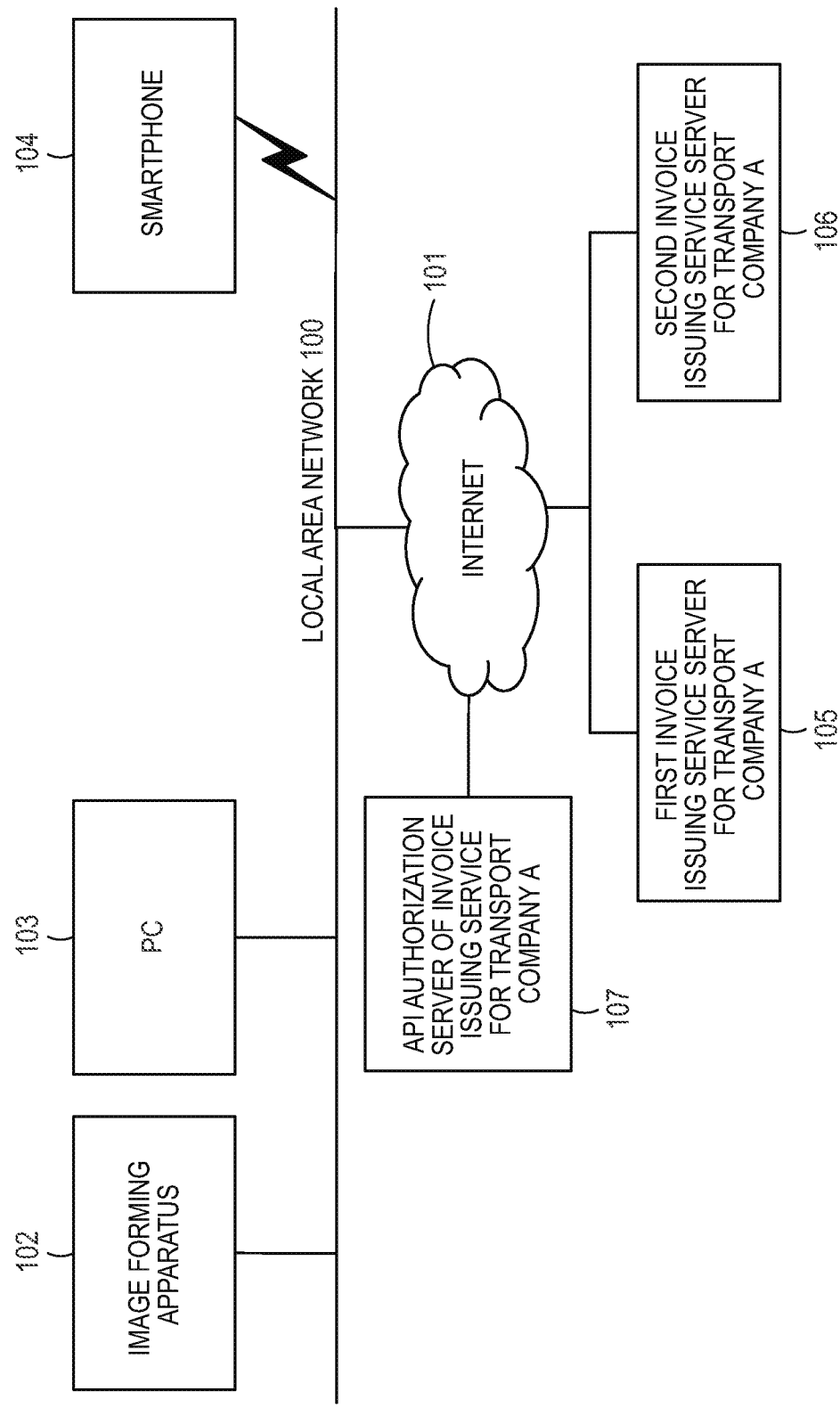
FIG. 1 illustrates a diagram showing the network configuration of a printing system according to the present embodiment.

FIG. 1 illustrates a diagram showing the network configuration of a printing system according to one embodiment of the present disclosure. On a local area network (LAN) 100, an image forming apparatus 102, a personal computer (PC) 103, and a smartphone 104 are communicatively connected to each other. The LAN 100 may be wired or wireless. The LAN 100 is also connected to an internet 101 via a router (not shown).

On the internet 101, invoice issuing service servers 105 and 106 and an API authorization server of an invoice issuing service 107 are located. The image forming apparatus 102, the PC 103, and the smartphone 104 can communicate with the invoice issuing service servers 105 and 106, the API authorization server of the invoice issuing service 107, and the like via the internet 101.

The image forming apparatus 102 can be a printer, multifunction peripheral (MFP), or other imaging apparatuses. The PC 103 and the smartphone 104 are information processing apparatuses, perform various settings of the image forming apparatus 102, and create and register an invoice for a package using the invoice issuing services provided by the invoice issuing service servers 105 and 106. The information processing apparatuses include tablet-type computers (not shown).

The invoice issuing service servers 105 and 106 are server systems for invoice issuing service provided by a transportation company. Here, the difference between the server 105 and the server 106 is, for example, that the server 105 provides an invoice issuing service for consumers and the server 106 provides an invoice issuing service for businesses. The configuration of the present embodiment is only an example, and the server 105 and the server 106 may be configured to provide different services on the same server.

In addition, the invoice issuing service servers 105 and 106 have functions as web servers that transmit web information to the internet. With these functions, the invoice issuing service servers 105 and 106 can transmit and receive files, data, and the like to and from the information processing apparatus equipped with a web browsing function via a web site disclosed on the internet.

The APT authorization server of the invoice issuing service 107 authorizes the use of the invoice issuing service. Each server 105 to 107 may be implemented by one computer or multiple computers, or may be configured to be implemented using cloud computing technology.

When creating and registering the invoice, the user inputs the information necessary for creating and registering the invoice from the PC 103 or the smartphone 104 into the invoice issuing service server (105 or 106). Information needed to create and register the invoice includes a name, an address, a telephone number and other contact information of the transmitter; a name, an address (destination), and contact information of the recipient; and contents of a package to be delivered (item name), and the date and time of desired delivery. This information is input to the invoice issuing service server (105 or 106) from the transmitter's PC 103 or smartphone 104 via the web service. If information necessary for creating and registering the invoice is input, the invoice issuing service server associates the input information with a slip number and a reservation number of the invoice issued for the input information and registers the information in the invoice database. At this time, the reservation number of the created and registered invoice is notified to the PC 103 or the smartphone 104 of the creation and registration source. The reservation number can be used as identification information to identify the invoice information registered in the invoice issuing service server (105 or 106).

The image forming apparatus 102 can obtain the invoice print data by notifying the invoice issuing service server (105 or 106) of the reservation number mentioned above and inquiring the print data of the invoice using the PC 103 or the smartphone 104. The invoice print data includes invoice image data (in any other format) and invoice information. The image forming apparatus 102 converts the printable image data from the obtained invoice image data and prints the image data according to the invoice information. The invoice information will be discussed later.

Figure 2:
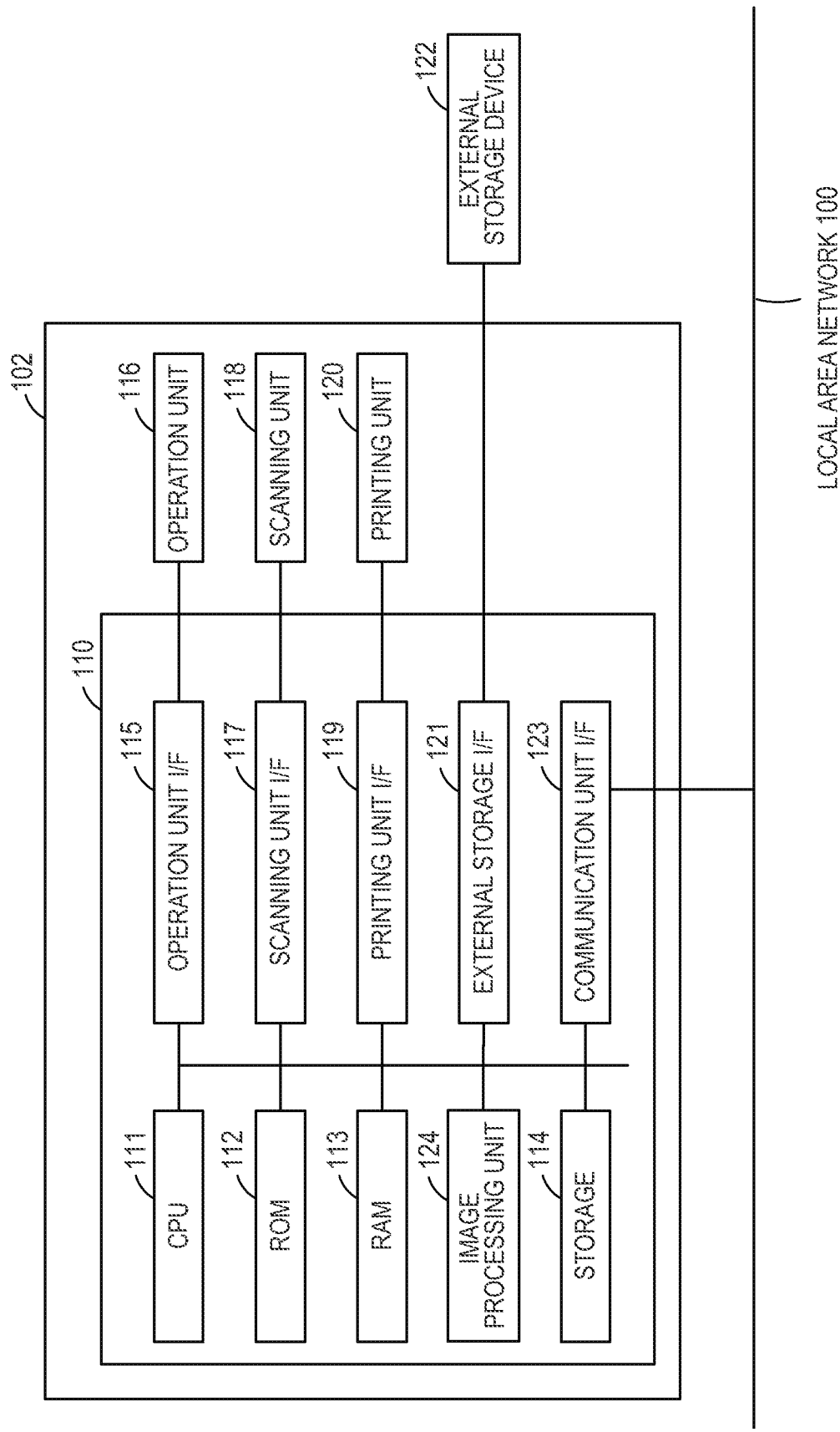
FIG. 2 illustrates a block diagram showing the configuration of the image forming apparatus according to the present embodiment.

FIG. 2 illustrates a block diagram showing an example of the configuration of the image forming apparatus 102. A control unit 110 including a CPU 111 controls the operation of the entire image forming apparatus 102. The CPU 111 performs various controls such as scan control and print control by reading the control program stored in a ROM 112 or a storage 114 into a RAM 113 and executing the control program.

The ROM 112 stores control programs executable by the CPU 111. The ROM 112 also stores boot programs, font data, etc. The RAM 113 is the main memory of the CPU 111 and is used as a temporary storage area for deploying various control programs stored in the work area, the ROM 112, and the storage 114.

The storage 114 stores image data, print data, an address book, various programs, and various setting information. In the present embodiment, a flash drive is assumed as the storage 114. An auxiliary storage device, such as an SSD (Solid State Drive), an HDD (Hard Disk Drive), or an eMMC (embedded Multi Media Card), may be used as the storage 114.

In the image forming apparatus 102, one CPU 111 uses one memory (RAM 113) to perform each of the processes shown in a flowchart described later, but other configurations may be applied. For example, multiple CPUs, RAMs, ROMs, and storages can work together to perform each of the processes described in the flowchart below. In addition, hardware circuits such as ASICs and FPGAs may be used to perform some processing.

An operation unit I/F 115 connects an operation unit 116 to the control unit 110. The operation unit 116 displays information to the user and detects input from the user. A scanning unit I/F 117 connects a scanning unit 118 to the control unit 110. The scanning unit 118 scans an image on a document and converts the image into image data, such as binary data. The image data generated by the scanning unit 118 is transmitted to an external apparatus, stored in an external recording apparatus, or printed on recording sheet.

A printing unit I/F 119 connects a printing unit 120 and the control unit 110. The CPU 111 transfers image data to be printed (target image data) to the printing unit 120 via the printing unit I/F 119. The printing unit 120 prints the image on recording sheets fed from a sheet feed cassette (not shown) using toner supplied from a cartridge (not shown).

An external storage I/F 121 connects an external storage device 122 to the control unit 110. The CPU 111 stores image data in the external storage device 122 via the external storage I/F 121. In the present embodiment, a USB interface is assumed as the external storage I/F 121 and a USB flash drive is assumed as the external storage device 122, but an external storage device such as an SD card may be used.

A communication unit I/F 123 is an interface connecting the LAN 100 and the control unit 110. The control unit 110 is connected to the LAN 100 by the communication unit I/F 123. That is, the control unit 110 can be connected to the API authorization server of the invoice issuing service 107 and the invoice issuing service servers 105 and 106, and the like, via the communication unit I/F 123, LAN 100, and internet 101.

The control unit 110 connects to the API authorization server of the invoice issuing service 107 and obtains an authorization code (access token) of the invoice issuing service API provided by the invoice issuing service servers 105 and 106. The control unit 110 connects to the invoice issuing service servers 105 and 106, presents the access token of the invoice issuing service API, and executes the invoice acquisition service from the invoice issuing service API to obtain the invoice image data and the invoice information. The authentication information for obtaining the access token of the invoice issuing service API can be registered and changed by accessing the image forming apparatus 102 from the PC 103 or the smartphone 104 via the communication unit I/F 123.

An image processing unit 124 performs various image processing, such as RIP processing, color conversion processing, and halftoning processing on the image data received via the communication unit I/F 123 to generate image data printable by the printing unit 120.

Figure 3:
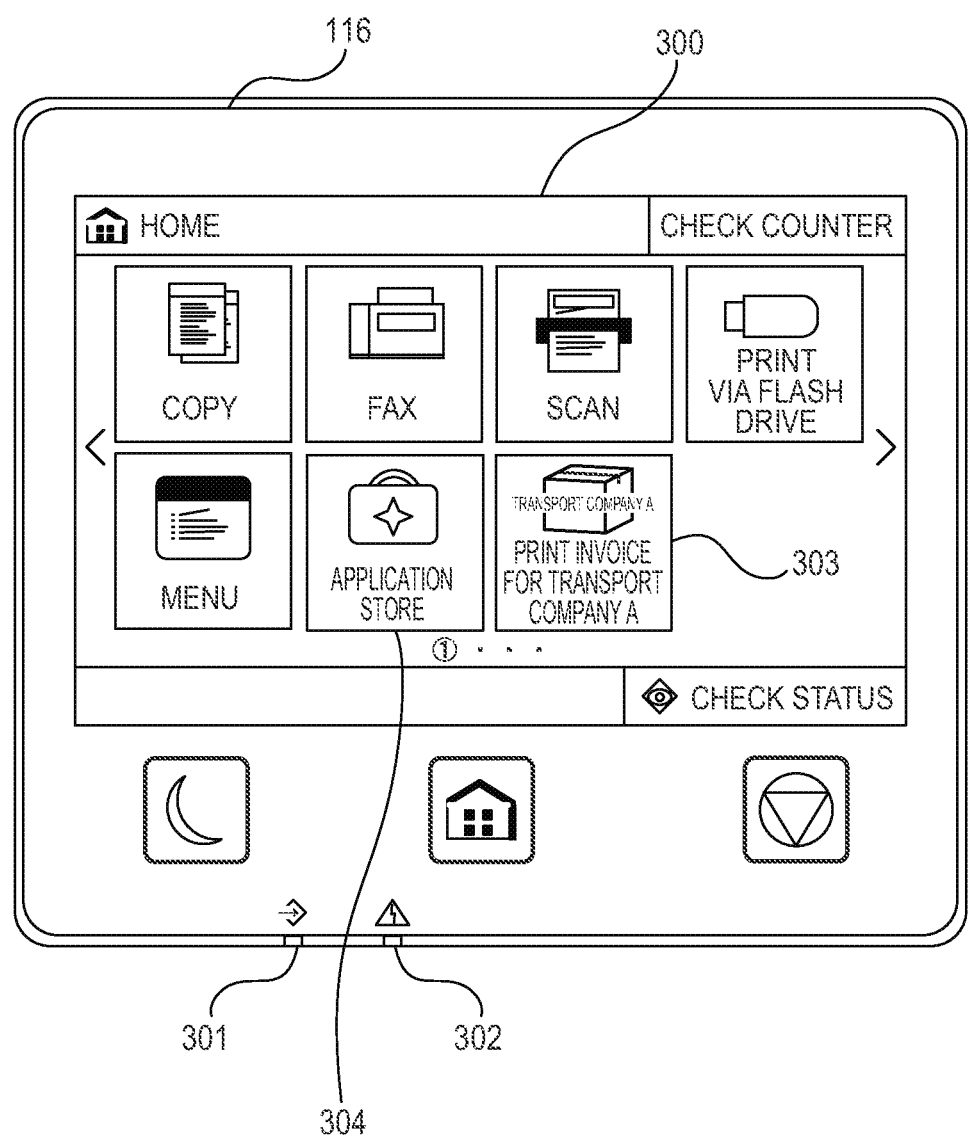
FIG. 3 illustrates a diagram showing the operating unit of the image forming apparatus according to the present embodiment.

FIG. 3 illustrates an example of the operation unit 116. The operation unit 116 has a touch panel 300, a data LED 301, and an error LED 302.

The touch panel 300 functions as a display unit and an input unit. On the touch panel 300 shown in FIG. 3, the home screen that is displayed immediately after the start of the image forming apparatus 102 is shown. The user can instruct execution of each function of the image forming apparatus 102 on the home screen. On the home screen, button images, such as copy, scan, menu, and address book, are displayed to execute each function by the image forming apparatus 102. The home screen also shows a "print invoice for transport company A" button 303, an application store button 304, and more.

The button 303 is a button to launch an invoice printing application in the present embodiment. The invoice printing application is pre-installed in ROM 112. Alternatively, by pressing the application store button 304 for connecting to an external application distribution server (not shown) via the LAN 100 or the internet 101, the software may be installed and used after downloading.

The invoice printing application is an application for obtaining the pre-created and registered invoice print data from the invoice issuing service server (105, 106) and printing the invoice print data using the image forming apparatus 102. The invoice printing application holds authentication information for using the invoice issuing service. The invoice printing application also holds an invoice printing condition table (FIGS. 10A to 10C, details described below) for determining printing conditions when the invoice print data received from the invoice issuing service server is printed by the image forming apparatus 102. The invoice printing application also holds an icon image to be displayed by the operation unit 116 and guide screen data for showing how to set sheets. This information is stored in the storage 114 with, for example, executable files of the invoice printing application.

The data LED 301 and the error LED 302 inform the user of the status of the image forming apparatus 102. The data LED 301 is illuminated while the image forming apparatus 102 is executing a job. The error LED 302 is illuminated if some error occurs in the image forming apparatus 102.

FIGS. 4A to 4E illustrate examples of the invoice issuing service authentication setting screens provided by the image forming apparatus 102 in the present embodiment. FIGS. 4A to 4E correspond to examples of the setting screens displayed in the web browser of the PC 103 when, for example, the PC 103 makes an HTTP connection to the image forming apparatus 102 via the web browser.

The screen in FIG. 4A illustrates registration status and service authentication status of the authentication information for each invoice issuing service. In the present embodiment, the authentication information of the first invoice issuing service server 105 and the second invoice issuing service server 106 can be registered from the screen of FIG. 4A, respectively. Here, the registration status of the authentication information indicates whether or not the authentication information for using the invoice issuing service is registered in the image forming apparatus 102. The service authentication status indicates whether authentication by the API authorization server of the invoice issuing service 107 has been completed using the registered authentication information. In the example of FIG. 4A, the service authentication status of the first invoice issuing service and the second invoice issuing service are both in the status of "not registered" and 'not authenticated', respectively.

Figure 4B:
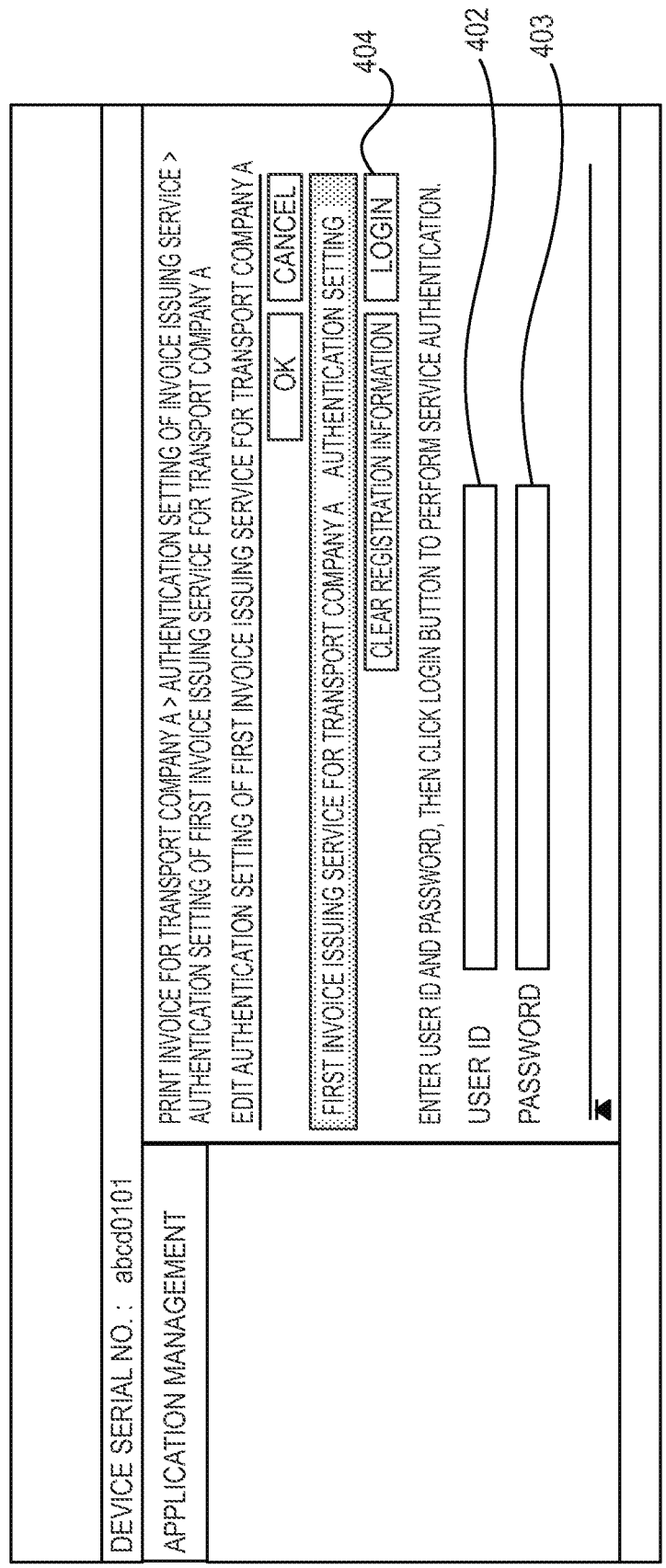
FIG. 4B illustrates the invoice issuing service authentication setting screen of the present embodiment.

If the edit button 401 is pressed on the screen of FIG. 4A, an authentication information edit screen shown in FIG. 4B is displayed. On the screen in FIG. 4B, the user enters authentication information to use the invoice issuing service. In the present embodiment, the user inputs a user ID and a password to input fields 402 and 403 as authentication information, respectively. On the screen of FIG. 4B, if the user ID and the password are entered in the input fields 402 and 403 and a login button 404 is pressed, the image forming apparatus 102 performs authentication processing using the user ID and the password in the sequence shown in FIG. 5, which is described later.

Figure 4C:
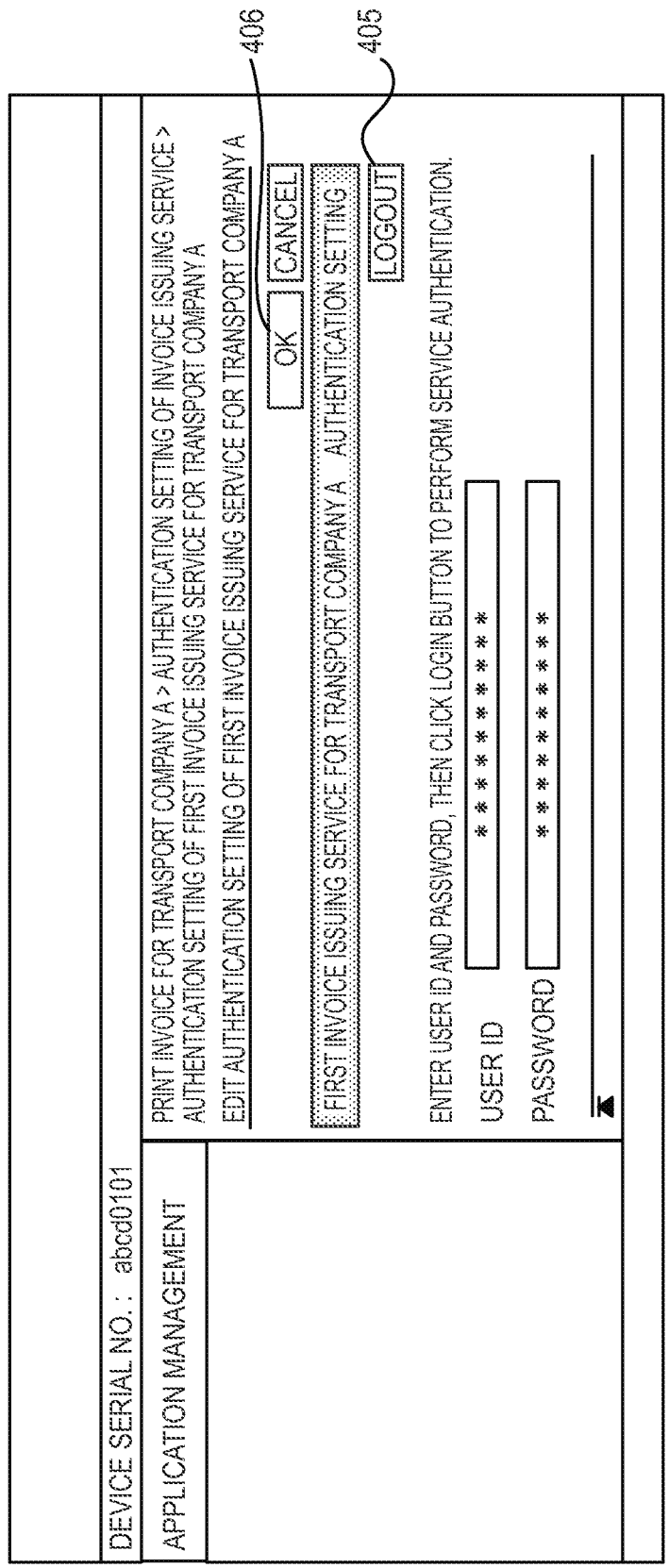
FIG. 4C illustrates the invoice issuing service authentication setting screen of the present embodiment.
Figure 4D:
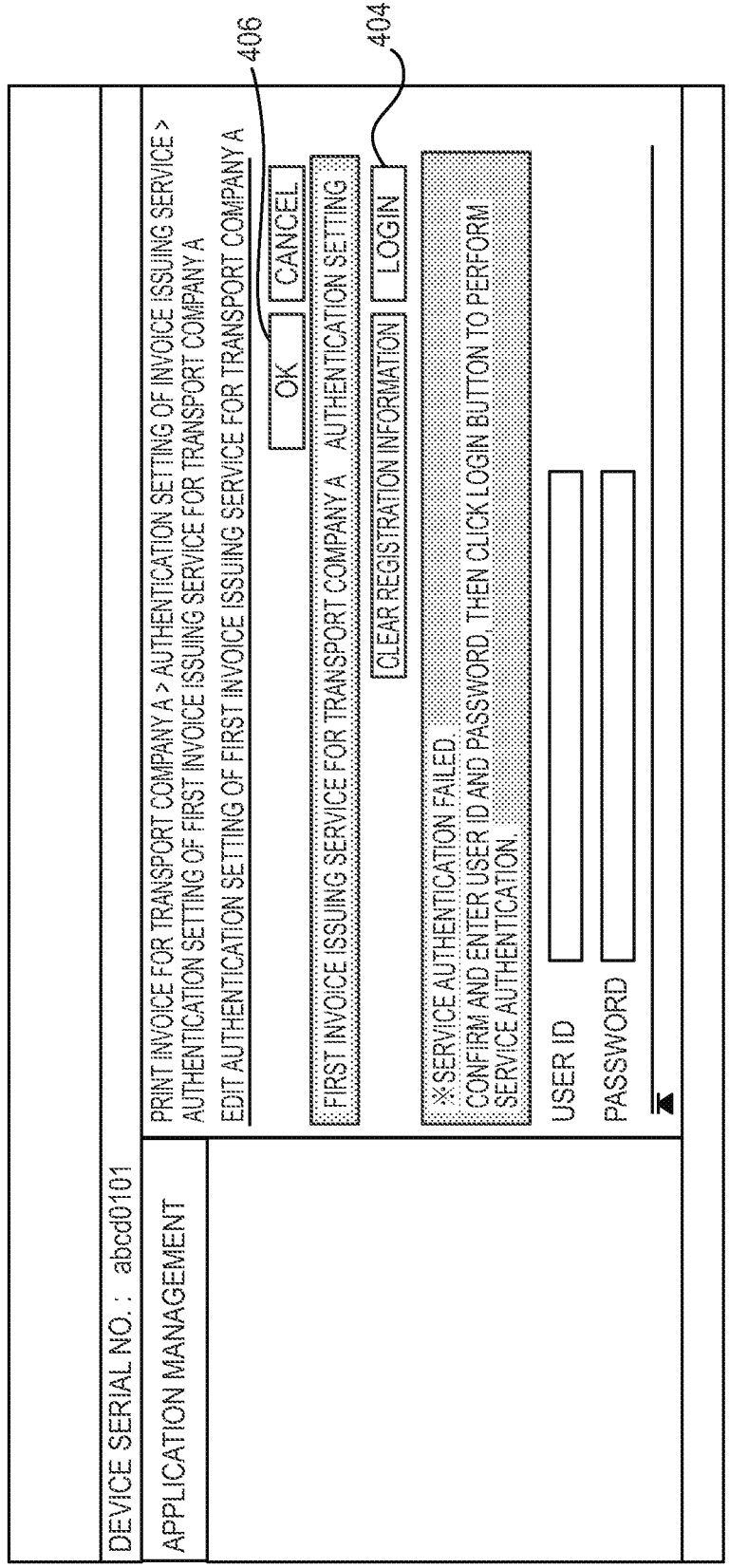
FIG. 4D illustrates the invoice issuing service authentication setting screen of the present embodiment.

Upon successful authentication, the screen shown in FIG. 4C displays the user ID and password using asterisks and a logout button 405 instead of the login button 404. If the logout button 405 is pressed, the screen of FIG. 4B is displayed again. If the authentication fails, the screen shown in FIG. 4D is displayed and prompts the user to confirm the authentication information and press the login button 404 again. If the OK button 406 is pressed in the state where the authentication is successful (the state in FIG. 4C), the registration status of the authentication information is changed to "registered" and the service authentication status is changed to "authenticated", and the screen in FIG. 4E is displayed.

FIG. 5 illustrates an example of the sequence in which the authentication is performed by the API authorization server of the invoice issuing service 107 if the login button 404 is pressed in FIG. 4B. In FIG. 5, the processing of the image forming apparatus 102 is based on a function realized by the CPU 11 reading and executing a program stored in the storage 114 or the like. The processing of the API authorization server of the invoice issuing service 107 is based on a function realized by the CPU of the apparatus including the server reading and executing a program stored in the storage device. The web browser is installed on the PC 103, and the CPU of the PC 103 executes the web browser.

If the user accesses the invoice issuing service authentication setting page (FIG. 4A) of the image forming apparatus 102 from the PC 103 via a web browser and presses the edit button 401 of the authentication information (step S501), the image forming apparatus 102 detects the above user operation. In response to the user operation in step S501, the image forming apparatus 102 displays the input screen (FIG. 4B) for authentication information (step S502).

If the user completes the entry of authentication information on the authentication information entry screen (FIG. 4B) and presses the login button 404 (step S503), the image forming apparatus 102 detects the above login operation.

The image forming apparatus 102 notifies the API authorization server of the invoice issuing service 107 of a token request including the authentication information in response to the pressing of the login button 404 (step S504). If the API authorization server of the invoice issuing service 107 confirms that the authentication information of the token request is correct, the API authorization server of the invoice issuing service 107 notifies the image forming apparatus 102 of the result in the token request response (step S505).

The image forming apparatus 102 displays the screen of FIG. 4C or FIG. 4D reflecting the result obtained from the received token request response (step S506). If the image forming apparatus 102 confirms that the authentication information is correct based on the token request response, the image forming apparatus 102 associates the access token of the token request response with the authentication information and stores the access token in the storage 114.

Instead of the PC 103, the user may access the image forming apparatus 102 from the smartphone via the web browser or the like installed in the smartphone.

FIGS. 6A to 6E illustrate the screen flow when creating and registering an invoice using the invoice issuing service with the smartphone 104 in the present embodiment. Hereafter, FIGS. 6A to 6E are collectively referred to as "FIG. 6". An invoice issuing application is installed in the smartphone 104, and the function shown in FIG. 6 can be realized by the CPU of the smartphone 104 executing the invoice issuing application.

First, the user activates the invoice issuing application installed in the smartphone 104, and inputs and processes the information necessary for transmitting a package while the smartphone 104 is connected to the invoice issuing service server (105 or 106) via the communication network. FIG. 6A illustrates an example of a top screen 600 of the application (invoice issuing application) connecting to the first invoice issuing service server 105. If the user presses a create new invoice button 601 on the top screen 600, the invoice issuing application displays a selection screen 610 for payment and shipping methods shown in FIG. 6B.

Figure 6B:
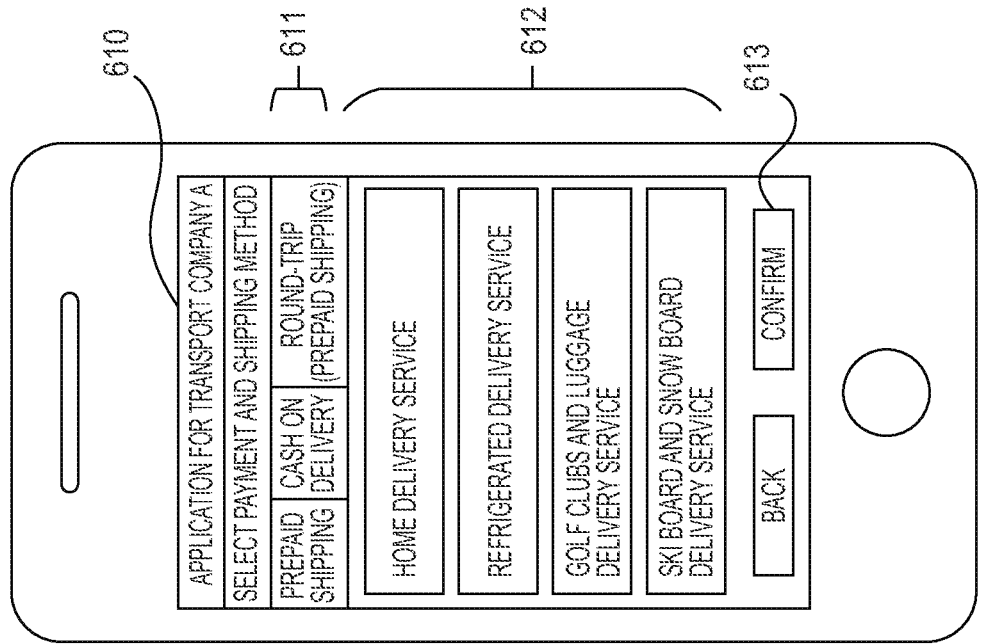
FIG. 6B illustrates a screen for creating and registering an invoice using the invoice issuing service.
Figure 6A:
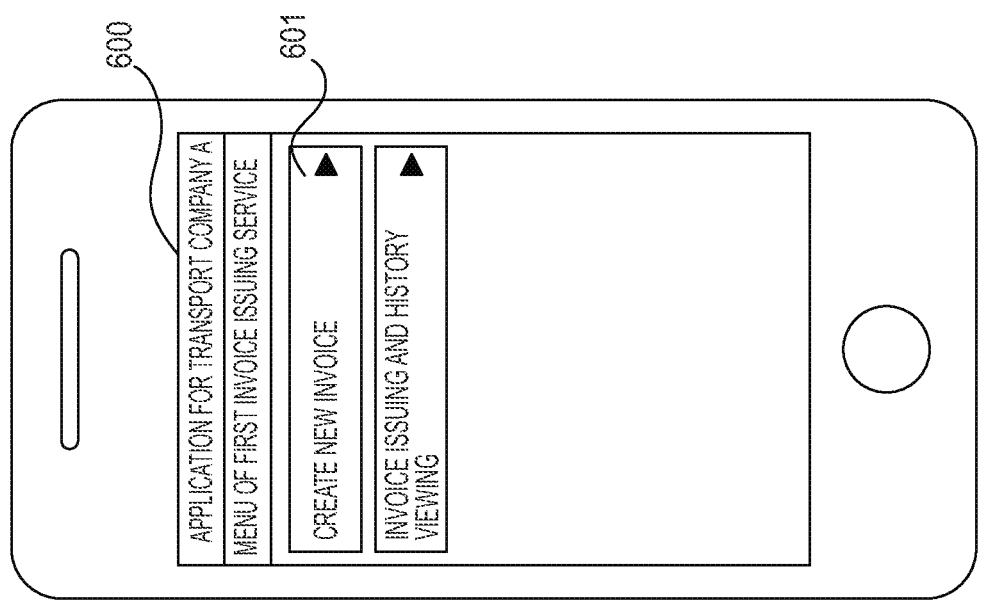
FIG. 6A illustrates a screen for creating and registering an invoice using the invoice issuing service.

After selecting a desired payment method and shipping method on a payment method selection list 611 and a shipping method selection list 612 on the selection screen 610 of FIG. 6B, the user presses a confirmation button 613 to decide the payment method and shipping method. In response to this operation, the invoice issuing application switches the screen display to input details of invoice screen 620 shown in FIG. 6C.

Figure 6C:
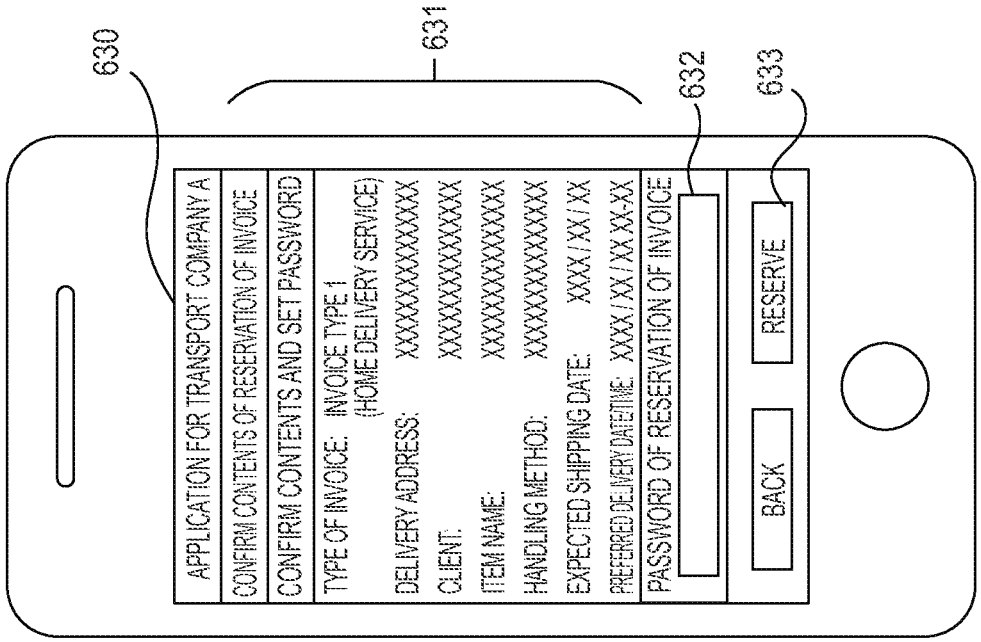
FIG. 6C illustrates a screen for creating and registering an invoice using the invoice issuing service.

In the input details of invoice screen 620 in FIG. 6C, a detail input field 621, a confirmation button 622, and the like are provided. The user inputs the information necessary for transmitting the package in the detail input field 621, specifically, a name, an address, a telephone number, and other contact information of the transmitter, a name, an address (destination), contact information, the content of the package to be delivered (item name), and the desired delivery date and time. After inputting the detailed information, the user presses the confirmation button 622 to determine the detailed information of the invoice. In response to this operation, the invoice issuing application switches the screen display to an invoice issuing reservation confirmation screen 630 shown in FIG. 6D.

Figure 6D:
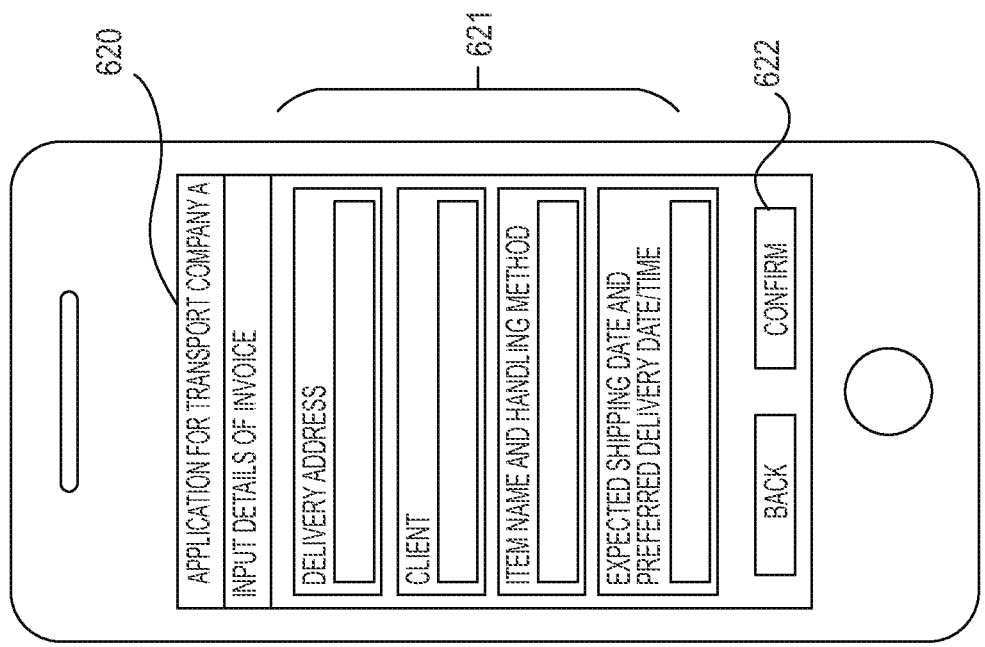
FIG. 6D illustrates a screen for creating and registering an invoice using the invoice issuing service.

In the screen 630 of FIG. 6D, a confirmation field 631 for invoice detail information and an input field 632 for a password of reservation of invoice, which are input and determined in the screen 620 of FIG. 6C, are displayed. After confirming that there are no errors in the input contents of the invoice, the user sets an optional password of reservation of the invoice and reserves the issue of the invoice by pressing reserve button 633. In response to this operation, the invoice issuing application transmits the invoice information confirmed in the confirmation field 631 to the first invoice issuing service server 105. The first invoice issuing service server 105 processes the invoice information received from the invoice issuing application of the smartphone 104. If the first invoice issuing service server 105 receives the above-mentioned invoice information, the first invoice issuing service server 105 issues a reservation number. Further, the first invoice issuing service server 105 registers the received invoice information in the database as detailed information necessary for issuing the invoice in association with the reservation number. In this case, the first invoice issuing service server 105 may generate invoice image data using the invoice information and store the invoice image data in the storage device in association with the reservation number. The invoice image data may be generated when the image forming apparatus 102 requests obtaining the invoice data. Furthermore, the first invoice issuing service server 105 responds with the reservation number to the invoice issuing application of the transmitter of the invoice information. Upon receiving this response, the invoice issuing application switches the screen to completion of reservation of invoice screen 640 shown in FIG. 6E.

Figure 6E:
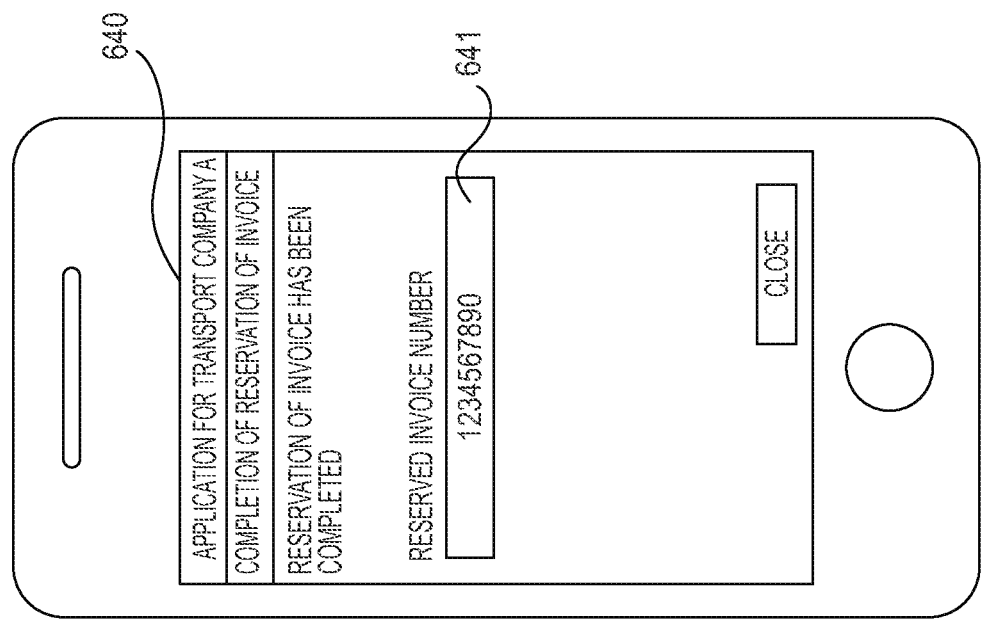
FIG. 6E illustrates a screen for creating and registering an invoice using the invoice issuing service.

In the completion of reservation of invoice screen 640 shown in FIG. 6E, the reservation number issued from the first invoice issuing service server 105 is displayed in an invoice issue reservation number field 641. Here, the reservation number is a management number issued when the invoice information determined on the screen 630 of FIG. 6D is accepted by the first invoice issuing service server 105. The first invoice issuing service server 105 associates detailed information necessary for issuing the invoice with the reservation number and registers detailed information in a database. Using the reservation number issued and the password set on the screen 630 of FIG. 6D, the user can obtain the invoice print data associated with the reservation number.

Next, the processing of the invoice printing application of the image forming apparatus 102 in the present embodiment will be described with reference to FIGS. 7, 8A to 8I, and 9. The invoice printing application receives the reservation number issued by the operation unit of the printer as shown in FIG. 6, and prints the invoice by using the printer. The invoice printing application is a common application applicable to a wide variety of the image forming apparatus 102, such as monochrome laser printers, color laser printers, inkjet printers, and the like. In the present embodiment, the image forming apparatus 102 includes a monochrome laser printer as a printing unit 120.

Figure 7:
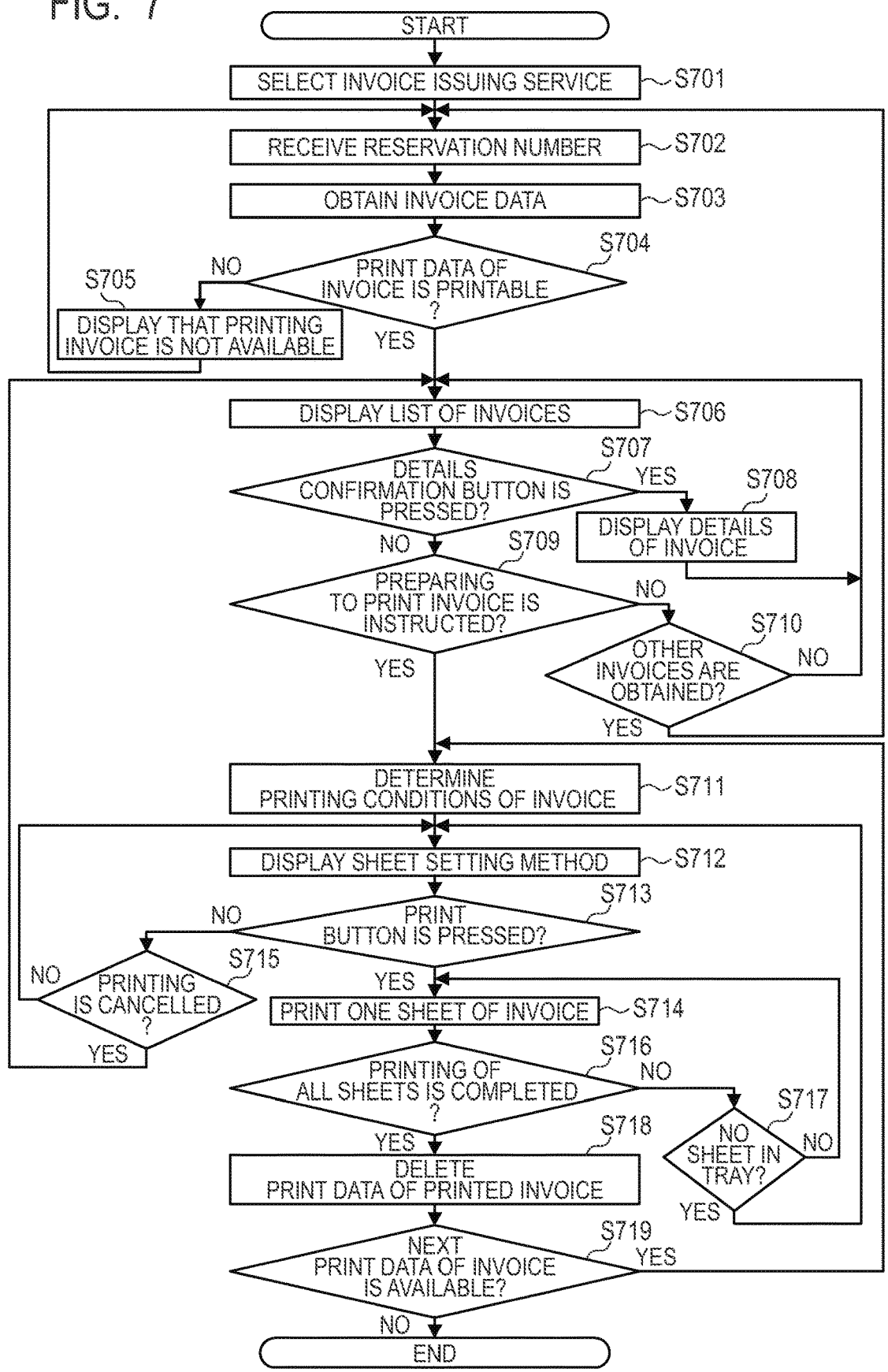
FIG. 7 illustrates a flowchart showing a processing of an invoice printing application.

FIG. 7 illustrates a flowchart showing the processing of the invoice printing application. Each step shown in the figure is realized by the CPU 111 of the image forming apparatus 102 reading a program loaded into the RAM 113 from the storage 114 or the like and executing the program. In FIG. 7, the invoice printing application is mainly described. FIGS. 8A to 8I illustrate examples of the operation screen displayed on the operation unit 116 of the image forming apparatus 102 in each process of the invoice printing application. Hereafter, FIGS. 8A to 8I are collectively referred to as "FIG. 8". FIG. 9 illustrates a diagram showing an example of the sequence in which the image forming apparatus 102 obtains the reserved invoice print data from the invoice issue service server (first invoice issue service server 105). FIGS. 10A to 10C illustrate a diagram showing an example of the invoice printing condition table of the present embodiment.

First, if the user presses the invoice printing application button (print invoice for transport company A button 303) on the home screen 300 of the operation unit 116, the invoice printing application displays the invoice issuing service selection screen shown in FIG. 8A and starts the processing of this flowchart. In step S701, the invoice printing application advances the process to step S702 if the user selects a button 801 for the invoice issuing service to be used among the list of the invoice issuing services and presses an input reservation number button 802.

In step S702, the invoice printing application displays the reservation number input screen shown in FIG. 8B on the operation unit 116 to receive the input of the reservation number. If the user inputs the invoice reservation number and the reservation password, and presses a button 803 for obtaining print data of an invoice, the process proceeds to step S703.

In step S703, the invoice printing application displays the in-communication screen shown in FIG. 8C on the operation unit 116, and obtains invoice print data corresponding to the reservation number from the first invoice issuing service server 105 according to the sequence shown in FIG. 9. Details of the obtaining sequence of invoice print data will be described later. Upon obtaining the invoice print data from the first invoice issuing service server 105, the process proceeds to step S704. The invoice print data includes invoice image data and invoice information. The invoice information includes, for example, an invoice type, a type of invoice issuing service, and various other information displayed on the detailed invoice information shown in FIG. 8F described below.

In step S704, the invoice printing application determines whether or not the invoice print data obtained in step S703 can be printed by the image forming apparatus 102. Here, it is determined whether or not the invoice print data can be printed by the image forming apparatus 102 based on referring to the invoice printing condition table shown in FIGS. 10A to 10C.

The invoice printing condition table may include a type of invoice issuing service, an invoice type, a sheet size, a sheet type (kind of sheets), a sheet tray, a sheet orientation, an orientation of a printing surface, color/monochrome modes when printing, availability information, and the like. FIGS. 10A, 10B, and 10C correspond to an "invoice printing condition table for a color laser printer", an "invoice printing condition table for a monochrome laser printer", and an "invoice printing condition table for an inkjet printer", respectively. Because the image forming apparatus 102 of the present embodiment has the printing unit 120 as a "monochrome laser printer", the "invoice printing condition table for a monochrome laser printer" shown in FIG. 10B is referred to.

If invoice type information is included in the invoice print data obtained in step S703, the invoice printing application refers to the invoice printing condition table shown in FIGS. 10A to 10C with the invoice type information as a key to determine whether printing is possible or not. Information on the invoice issuing service and invoice type selected in step S701 may be used as a key. If the invoice print data does not include information on the invoice type, the information on the invoice issuing service selected in step S701 is used as a key to refer to the invoice printing condition table.

In the "invoice printing conditions table for monochrome laser printer" shown in FIG. 10B, regarding the "first invoice issuance service for transport company A", printing availability information is "available" for both "type 1 of invoice" and "type 2 of invoice". In this case, the invoice printing application determines that the image forming apparatus 102 is printable "type 1 of invoice" and "type 2 of invoice". Regarding the "second invoice issuance service for transport company A", printing availability information is "not available" because the printing color mode is "color". In this case, the invoice printing application determines that the image forming apparatus 102 having the printing unit 120 as a monochrome laser printer is not printable an invoice of "second invoice issuance service for transport company A".

In step S704, if the invoice print data obtained in step S703 is not printable by the image forming apparatus 102 (No in step S704), the process proceeds to step S705. In step S705, the invoice printing application displays the screen shown in FIG. 8D to inform the user that the invoice cannot be printed. If the user presses a close button 804 on the screen of FIG. 8D, then the process returns to step S702. Further, the invoice printing application displays the reservation number input screen of FIG. 8B and receives the reservation number input by the user again.

On the other hand, if the invoice print data obtained in step S703 is printable by the image forming apparatus 102 (Yes in step S704), the process proceeds to step S706.

In step S706, the invoice printing application displays the list of the invoice screen shown in FIG. 8E and receives user operations. Here, the list of the obtained invoice print data is displayed. If the user presses a confirm details button 805 on the list of the invoice screen of FIG. 8E (Yes in step S707), the process proceeds to step S708.

In step S708, the invoice printing application displays the invoice detail screen shown in FIG. 8F. The invoice detail screen in FIG. 8F displays detailed information about the invoice, such as an invoice type; an invoice number; a name, and contact information such as an address and a phone number of the transmitter; name, an address, and contact information of the recipient; contents of the package to be delivered (item name); and desired delivery date and time. The information is displayed using the invoice information included in the invoice print data. If the user presses a close button 808 in the invoice detail information screen of FIG. 8F, the process returns to step S706 and displays the invoice list screen of FIG. 8E again.

If the user presses a button 806 to add other invoices in the invoice list screen of FIG. 8E (No in step S707, No in step S709, and Yes in step S710), the process returns to step S702. In this case, the invoice printing application receives input of reservation numbers for other invoices (step S702) and obtains new invoice print data (step S703). FIG. 8G illustrates an example of the invoice list screen with two invoice print data obtained.

If the user presses a next button 807 in the invoice list screen of FIG. 8E or FIG. 8G (No in step S707 and Yes in step S709), the process proceeds to step S711.

In step S711, the invoice printing application loads the invoice print data to be printed and determines the printing conditions of the invoice with reference to the invoice printing condition table (invoice printing condition table for the monochrome laser printer) shown in FIG. 10B. Here, the printing conditions of the invoice are determined by referring to the invoice printing condition table shown in FIG. 10B with the invoice type information "type 1 of invoice" as a key attached to the invoice print data of reservation number "1234567890" obtained from "first invoice issuing service". In this example, referring to the invoice printing condition table, a printing sheet type, and an output color mode as the printing conditions are determined to be the following: "A4" for the sheet size, "label sheet" for the sheet type, "manual feed tray" for the tray type, "set sheet vertically" for the sheet orientation, "set face up" for the printing side, and "monochrome" for the printing color mod. Note that the type of invoice issuing service selected in step S701 (for example, "first invoice issuing service") and information of invoice type may be used as keys. If no invoice type information is included in the invoice print data, the type of invoice issuing service (for example, "second invoice issuing service") is used as the key to determine the printing conditions.

Then, in step S712, the invoice printing application displays the guide screen shown in FIG. 8H for instructing how to set sheets to the image forming apparatus 102. The guide screen for instructing how to set sheets is prepared for each printing condition (i.e., for each invoice type information), for example, and the guide screen for instructing how to set sheets corresponding to the invoice type is displayed. That is, the guide screen for instructing how to set sheets is displayed according to the fact that the information of the invoice type is included in the obtained invoice print data.

If the invoice type information is not included in the invoice print data, the display of the guide screen for instructing how to set sheets (step S712) and the determination of pressing a button (step S713) described later are skipped, and the process proceeds to step S714 to start printing. That is, if the information of the invoice type is not included in the obtained invoice print data, the printing of the invoice print data is started.

Figure 8I:
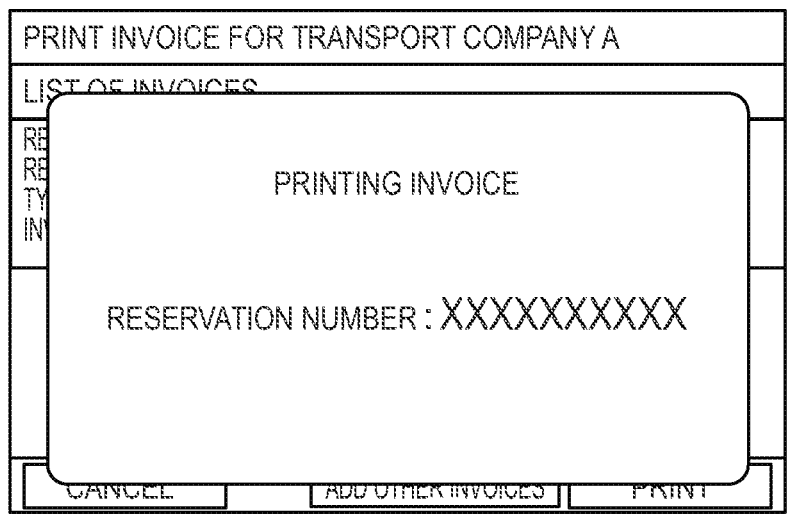
FIG. 8I illustrates the operation screen of the invoice printing application.

Then, if the user places the invoice printing sheet on the sheet tray and presses a print button 809 in FIG. 8H (Yes in step S713), the process proceeds to step S714. In step S714, the invoice printing application displays the printing screen shown in FIG. 8I, and prints out the invoice for one page by the printing unit 120. Here, printing is started in response to pressing the print button 809, but printing may be started in response to other operations (for example, in response to detecting that a sheet is set in the sheet tray).

On the other hand, if the user presses a cancel button 810 on the screen of FIG. 8H (No in step S713 and Yes in step S715), the invoice printing application stops printing the invoice print data, and the process returns to step S706. The invoice printing application then displays the list of the invoice screen of FIG. 8E or FIG. 8G.

After printing out the invoice for one page in step S714, the process proceeds to step S716. In step S716, the invoice printing application confirms whether printing of all pages of the invoice print data has been completed. If there are pages that have not yet been printed (No in step S716), the process proceeds to step S717.

In step S717, the invoice printing application confirms the presence or absence of a sheet on the sheet tray. If it is determined that there is no sheet (out of sheets) (Yes in step S717), the process returns to step S712. Then, after displaying the guide screen for instructing how to set sheets as shown in FIG. 8H, the invoice printing application controls to print out the remaining pages by repeating the processes of steps S713 to S716. On the other hand, if it is determined that there is still a sheet on the sheet tray (No in step S717), the process returns to step S714 and controls to print out the next page.

If it is determined in step S716 that all pages have been printed (Yes in step S716), the process proceeds to step S718. In step S718, the invoice printing application erases the invoice print data that has been printed and the process proceeds to step S719.

In step S719, the invoice printing application confirms the presence or absence of the next invoice print data to be printed. Here, if it is determined that there is the next invoice print data to be printed (Yes in step S719), the process returns the processing to step S711, loads the invoice print data to be printed, and controls to repeat the processing of steps S712 to S718 to print out the invoice. In this case, in step S712, if the invoice type is same as the invoice type of the previous invoice, the display of the guide screen for instructing how to set sheets (step S712) and the determination of pressing the button (step S713) may be skipped, and the process may proceed to step S714 to start printing.

On the other hand, if it is determined that there is no next invoice print data to be printed (No in step S719), the invoice printing application terminates the processing of this flowchart.

Here, the sequence in step S703 of FIG. 7 in which the image forming apparatus 102 obtains invoice print data from the first invoice issuing service server 105 based on the reservation number of the invoice is described using FIG. 9.

In the input reservation number screen of FIG. 8B, if the user inputs the reservation number and the reservation password of the invoice and presses the button 803 (step S901), the invoice printing application of the image forming apparatus 102 receives this instruction. Then, the invoice printing application of the image forming apparatus 102 transmits a request for obtaining invoice data corresponding to the reservation number to the first invoice issuing service server 105 along with the access token obtained in advance in the sequence of FIG. 5 (step S902).

The first invoice issuance service server 105 extracts the access token from the request for obtaining invoice data and inquires the information of the access token to the API authorization server of the invoice issuing service 107 (step S903). The API authorization server of invoice issuing service 107 verifies the validity of the received access token and notifies the first invoice issuing service server 105 of a verification result of the access token (step S904).

The first invoice issuing service server 105 verifies the validity of the access token based on the received verification result. If the access token is valid, the first invoice issuing service server 105 reads the invoice information of the reservation number from a database or the like (step S905). Further, the first invoice issuing service server 105 reads the invoice image data of the reservation number. If the invoice image data is not generated, the invoice image data is generated. Then, the first invoice issuing service server 105 notifies the image forming apparatus 102 of the invoice print data (including the invoice image data and the invoice information) obtained in step S905 (step S906). On the other hand, if the access token is invalid, the processing result is reported to the image forming apparatus 102 without doing anything.

Upon receiving the invoice print data (including invoice image data and invoice information), the invoice printing application of the image forming apparatus 102 stores the received invoice print data in the storage 114. Further, the invoice printing application displays the invoice information of the reservation number on the invoice list screen of FIG. 8E (step S907).

As described above, the image forming apparatus 102 can make the user easily recognize operations that need to be performed in the printer, such as how to set the invoice printing sheet, even if the printer alone prints the invoice without using an information processing apparatus, such as a personal computer.

As described above, according to the fact that the information of the predetermined sheet (information of the invoice type, etc.) is included in the invoice print data obtained from the invoice service server by an instruction received from the operation panel of the printer, the method of setting the sheet for printing the invoice print data is displayed. Thus, even if the invoice is printed by an image forming apparatus alone, such as a printer or MFP, without using the information processing apparatus such as a PC, the user can easily recognize operations (how to set a sheet) that need to be performed by the image forming apparatus on the printer. As a result, it is possible to reduce the waste of an expensive sheet by using the wrong type of invoice sheets, making a mistake in the print setting or the sheet placement direction on the tray, or causing a misprint. That is, it is possible to restrain wasting sheets due to a mistake in setting the sheets.

The structure and contents of the various data described above are not limited to this, and the data includes various structures and contents according to the use and purpose.

Although one example embodiment has been described above, other embodiments can be implemented, for example, as a system, device, method, program, or storage medium. Specifically, some embodiments may be applied to a system consisting of multiple devices, or some embodiments may be applied to a device consisting of a single device. In addition, all of the configurations in which the above examples are combined are also included in the present disclosure.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-181756, which was filed on Nov. 8, 2021 and which is hereby incorporated by reference herein in its entirety.

What is claimed is:

1. An image forming apparatus comprising:
a sheet holder;
a printer that prints an image on a sheet fed by the sheet holder; and
a controller,
wherein the controller receives an instruction from a user,
wherein the controller obtains, from a server system, print data by accessing the server system in response to the instruction,
wherein the controller displays, on a display, a method of setting a sheet on the sheet holder in a case where a sheet set on the sheet holder is run out during printing the print data including information of a predetermined sheet, and
wherein the controller causes the printer to print an image based on the obtained print data on a sheet fed by the sheet holder.

2. The image forming apparatus according to claim 1, wherein the controller causes the printer to start printing the print data in response to a predetermined operation in a case where the method of setting the sheet on the sheet holder is displayed on the display.

3. The image forming apparatus according to claim 1, wherein the controller causes the printer to start printing the print data without displaying the method in a case where the obtained print data does not include the predetermined information of the predetermined sheet.

4. The image forming apparatus according to claim 1, further comprising:
a storage that stores a print condition associated with the information of the predetermined sheet, wherein the controller sets, based on the information of the predetermined sheet included in the print data, the print condition including at least one of a sheet size, a sheet type, a sheet orientation, a printing surface orientation, and a monochrome/color mode as a printing condition for printing the print data.

5. The image forming apparatus according to claim 1, wherein the controller determines whether or not the image forming apparatus can print the print data based on the information of the predetermined sheet included in the print data.

6. A method of controlling an image forming apparatus having a sheet holder and a printer that prints an image on a sheet fed by the sheet holder, the method comprising:
  receiving an instruction from a user;
  obtaining, from a server system, print data by accessing the server system in response to the received instruction;
  displaying, on a display, a method of setting a sheet on the sheet holder in a case where a sheet set on the sheet holder is run out during printing the print data including information of a predetermined sheet; and
  causing the printer to print an image based on the obtained print data on a sheet fed by the sheet holder.

7. A non-transitory computer-readable storage medium storing computer-executable instructions that, when executed, cause a computer to perform a method of controlling an image forming apparatus having a sheet holder and a printer that prints an image on a sheet fed by the sheet holder, the method comprising:
  receiving an instruction from a user;
  obtaining, from a server system, print data by accessing the server system in response to the received instruction;
  displaying, on a display, a method of setting a sheet on the sheet holder in a case where a sheet set on the sheet holder is run out during printing the print data including information of a predetermined sheet; and
  causing the printer to print an image based on the obtained print data on a sheet fed by the sheet holder.

* * * * *